United States Patent
Chan et al.

(10) Patent No.: US 8,375,290 B1
(45) Date of Patent: Feb. 12, 2013

(54) DOCUMENT VERSION MARKING AND ACCESS METHOD AND APPARATUS

(75) Inventors: Kevin Chan, Ryde (AU); Muneyb Minhazuddin, Quakers Hill (AU); Alexander Martin Scholte, Chatswood (AU); James D. Schreuder, Summer Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1420 days.

(21) Appl. No.: 10/787,503

(22) Filed: Feb. 25, 2004

(51) Int. Cl.
*G06F 17/00* (2006.01)
(52) U.S. Cl. ......... 715/229; 715/230; 713/176; 713/156
(58) Field of Classification Search .................. 715/511, 715/513, 523, 515, 229, 230; 713/176, 156
See application file for complete search history.

(56) References Cited

U.S. PATENT DOCUMENTS

| | | | |
|---|---|---|---|
| 6,480,885 B1 | 11/2002 | Olivier | |
| 6,654,779 B1 | 11/2003 | Tsuei | |
| 6,697,997 B1 | 2/2004 | Fujimura | |
| 6,886,018 B1 | 4/2005 | Boudris et al. | |
| 6,931,590 B2 | 8/2005 | Kanie et al. | |
| 2003/0065727 A1 | 4/2003 | Clarke et al. | |
| 2004/0107175 A1* | 6/2004 | Hung et al. | 707/1 |
| 2004/0107214 A1 | 6/2004 | Hung et al. | |
| 2004/0237031 A1* | 11/2004 | Micali et al. | 715/511 |

\* cited by examiner

*Primary Examiner* — Stephen Hong
*Assistant Examiner* — Matthew Ludwig
(74) *Attorney, Agent, or Firm* — Sheridan Ross P.C.

(57) ABSTRACT

The present invention is directed to document or file access control. In particular, embodiments of the present invention alter files that are obsolete, so that it is apparent to a user that an updated version of the file should be obtained. Accordingly, files that are subject to revisions can be stored locally, to provide fast and convenient access to such files, with assurance that notice will be provided to a user if the locally stored version of a file becomes obsolete. Furthermore, the invention allows files stored locally that have become obsolete to be identified automatically. The alteration of obsolete files may include the placement of a watermark on or embedded in such files to provide an obvious indication to a user that the file is obsolete.

5 Claims, 4 Drawing Sheets

DOCUMENT VERSION MARKING AND ACCESS METHOD AND APPARATUS

FIELD OF THE INVENTION

The present invention is directed to controlling access to electronic files. In particular, the present invention is directed to notifying a user if a requested file is obsolete.

BACKGROUND OF THE INVENTION

Documents and other data are often stored in electronic form. When files are stored on a network, it is often more convenient for a user to store that document locally for quicker access. However, where documents are subject to modification or revision by other users or by a central authority, the version stored locally may become obsolete.

In order to ensure that a user has the most up-to-date version of a file, systems that provide a notification when the document has been updated or has otherwise become obsolete have been developed. For example, document control systems may provide an email message providing such notification. However, such systems do not directly associate such notification with a locally stored file. Accordingly, a user that did not see the notification can open and use an obsolete file without being informed that the file is obsolete. In addition, a user must manually compare the document stored locally against the latest version, if verification that the file stored locally is actually obsolete is to be obtained.

Alternatively, a user may choose to always retrieve a document from a central repository at which the most current version is stored. However, this can result in greater access times. In particular, the user must download the entire document each time the user opens the file.

SUMMARY OF THE INVENTION

According to embodiments of the present invention, file or document version marking and access control methods and apparatuses are provided. The present invention allows a user to store versions of documents or other files locally, and provides notification to the user that the local copy is obsolete if an updated version is available.

In accordance with embodiments of the present invention, a document or other file is assigned a unique document or file identifier. In addition, each version of a document or other file is assigned a version identifier. In accordance with embodiments of the present invention, a script or object is associated with the file. The script operates to determine whether the associated copy of the file is obsolete by initiating a check with a document or file control authority when the file is accessed by a user. If the check indicates that the locally stored version of the file is obsolete, that copy of the file is altered to provide an indication that a newer version is available, or that for some other reason the locally stored version should not be relied upon by the user. In accordance with an embodiment of the present invention, the alteration of the file can include the association of a watermark with the file. In addition, the script may operate to report changes made to a document to the document control authority, to allow the authority to maintain a record and control of documents.

In accordance with additional embodiments of the present invention, encryption keys may be used to enforce access control policies. Therefore, according to embodiments of the present invention, a request to open a locally stored file may cause a request for a key necessary to open the file to be generated. This request may be made to a document or file control authority. In response to the request, the document control authority may return the key associated with the current version of the requested file. If the current version does not correspond to the version that the user is attempting to open, decryption of that file using the provided key will fail. Accordingly, the user will be denied access to the version of the document that the user is attempting to open. In response to such a failure, an updated version of the file may be obtained. In accordance with still other embodiments of the present invention, the key associated with a particular version of a file may expire when that version becomes obsolete. Accordingly, the key will become ineffective, and the user will be required to obtain the updated version of the file, and the corresponding key.

In accordance with embodiments of the present invention, a document control authority may be implemented as a network server on which information regarding the available versions of files or documents is maintained. In accordance with additional embodiments of the present invention, a central document storage system may be provided as a repository for the current versions of files. Alternatively, the current versions of files may be distributed among a number of devices on a network. Accordingly, implementation of embodiments of the present invention may be accomplished using simple scripts associated with documents stored on client or user devices, and using a document or file control application for verifying the most current version of a file running on a document control authority device.

Additional features and advantages of the present invention will become more readily apparent from the following discussion, particularly when taken together with the accompanying drawings.

DETAILED DESCRIPTION

Figure 1:
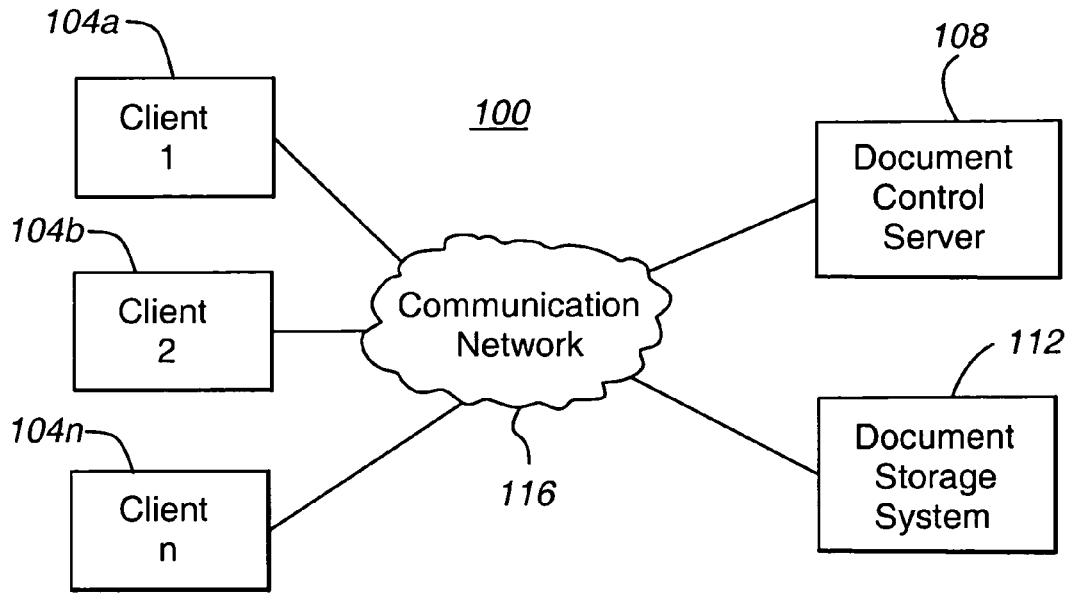
FIG. 1 is a block diagram of a computer network in accordance with an embodiment of the present invention.

With reference now to FIG. 1, a computer network comprising components of a document or file control system 100 in accordance with an embodiment of the present invention is depicted. As shown in FIG. 1, the document control system 100 may include a number of client devices or computers 104. Although FIG. 1 shows three client computers 104a, 104b and 104n, it should be appreciated that any number of client devices may be associated with the document control system 100. As also shown in FIG. 1, the document control system 100 generally includes a document control device or server 108. The document control system 100 may also include a document storage system 112. The provided components or nodes, including the client computers 104, document control server 108, and document storage system 112, are in communication with one another, for example over a communication network 116. For example, and as can be appreciated by one of skill in the art, the nodes 104, 108 and 112 may be interconnected to one another over a communication network 116 comprising a local area network, a wide area network, such as the Internet, or a combination of local and/or wide area networks. Although various functions will be described as being associated with various nodes 104, 108 and 112, it should be appreciated that the present invention is not so limited. Accordingly, the described functions may be distributed among different devices as convenient or necessary in connection with a particular application of the invention disclosed herein.

Figure 2:
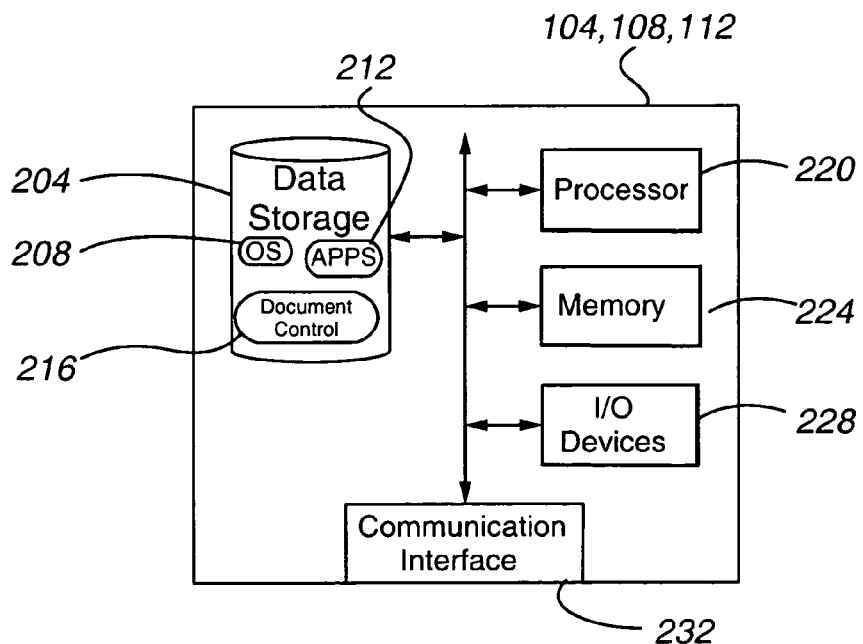
FIG. 2 is a block diagram of a computer network node in accordance with an embodiment of the present invention.

With reference now to FIG. 2, components of a network node 104, 108 or 112 such as may be used in connection with a document control system 100 in accordance with embodiments of the present invention are illustrated in block diagram form. In general, the node 104, 108 or 112 may include data storage 204 for storing operating instructions, including applications, and/or data, including files. For example, the data storage 204 of a network node 104, 108 or 112 may provide storage for an operating system 208, various applications 212, such as word processing, spreadsheet, presentation, or other applications, and a document control application 216, the functions of which will be described in greater detail herein, as well as documents or other files. As can be appreciated by one of skill in the art, the particular applications and data maintained on the data storage 204 will typically vary among nodes 104, 108 and 112. For instance, the document control application 216 maintained on a network node comprising a client computer 104 will generally comprise a client document control application 216, while a document control application 216 maintained on a network node comprising a document control server 108 will generally comprise a server document control application 216. The document storage system 112, if separately provided, may comprise a standard storage device, and embodiments of the present invention do not require that the document storage system 112 have a document control application. Other embodiments may feature a document storage system 112 that includes a document control application 216, operable to, for example, notify the document control server 108 of a new document or document version. As can be appreciated by one of skill in the art, the data storage 204 may comprise magnetic, optical, solid state or other types of data storage devices.

A network node 104, 108 or 112 also generally includes a processor 220 for executing instructions associated with the operating system 208 and/or applications 212, 216, and for performing operations involving data. The processor 220 may comprise a general purpose, programmable processor or digital signal processor, and may execute instructions stored in the data storage 204, on other storage devices, or network nodes. Memory 224 may be provided for use in connection with the execution of instructions and processes by the processor 220. The memory 224 may comprise solid state memory, such as DRAM or SDRAM.

In addition, the network nodes 104, 108 or 112 may comprise various input and output devices 228. Examples of such input/output devices 228 include keyboards, pointing devices, audio inputs, audio outputs, video displays, printers, or other devices for receiving input or providing output. In addition, each node 104, 108, 112 may include a communication interface 232 for interconnecting the node to other nodes, for example across the communication network 116.

Figure 3:
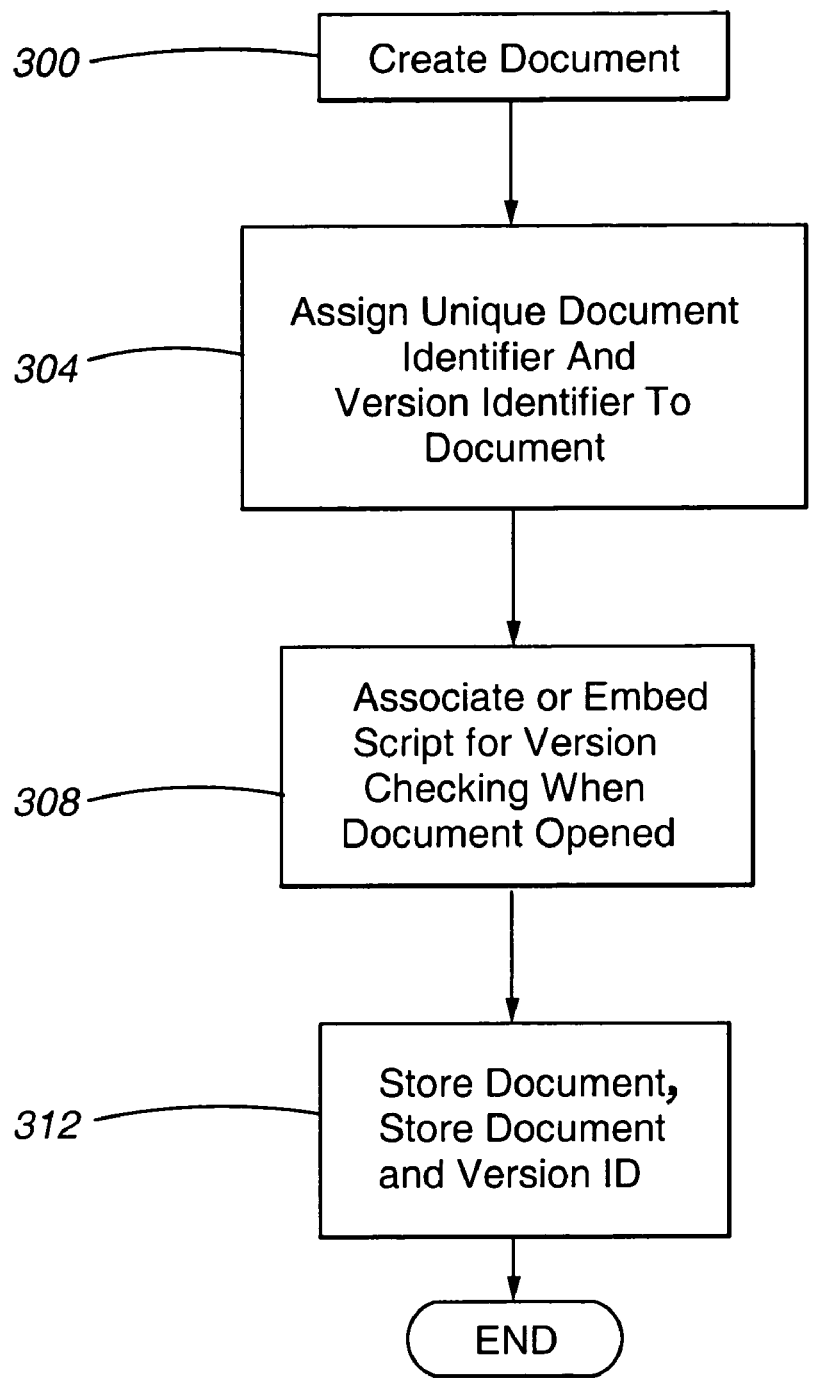
FIG. 3 is a flowchart depicting aspects of the operation of embodiments of the present invention.

With reference now to FIG. 3, aspects of the operation of embodiments of the present invention are illustrated. As can be appreciated by one of skill in the art and from the description provided herein, aspects of the operation of system 100 in accordance with embodiments of the present invention may be controlled by document control applications 216 running on various nodes 104, 108 and/or 112. At step 300, a file is created, for example on a client computer 104. As depicted in FIG. 3, the created file may comprise a document. Furthermore, for ease of description, the operation of systems in accordance with embodiments of the present invention will be described in connection with a file comprising a document. However, it should be appreciated that the present invention is not so limited. In particular, a file may include any collection of data that can be passed to or accessed by a node 104, 108, 112.

At step 304, a unique document identifier and a version identifier are assigned to the document. As an example, the unique document identifier may comprise a unique set of alphanumeric characters and the version identifier may comprise a version number. The unique document identifier and version identifier may be stored as part of or with the document, so that the document identifier and version identifier are immediately accessible and are unambiguously associated with each copy of the document. The step of assigning identifiers may be performed by operation of a document control application 216 on the client computer, which may query the document control server 108. The document control server 108, by operation of a document control application 216 running on the document control server 108, may return a unique identifier and a version number. At step 308, a script or executable object for version checking is associated with or embedded in the file. In particular, the script or executable object may allow version checking to be performed automatically when the file is opened or requested. In accordance with embodiments of the present invention, the script or object can be implemented as a VISUAL BASIC macro or as an embedded COM object. The step of associating or embedding a script or executable object can be performed by a document control application 216 when the file is saved to a system (i.e., saved on a node 104, 108 or 112 of a document control system 100) implementing an embodiment of the present invention, or by registering the document with a document control system 100 in accordance with an embodiment of the present invention. At step 312, the document is stored. As can be appreciated by one of skill in the art, the file may be stored on any node 104, 108 or 112 of a document control system 100. For example, the file may be stored in a document storage system 112 for access by any user on the network 116, and may additionally or alternatively be stored on the client 104 used to create the file or on any other client 104 to provide fast access to the file. Also at step 312, the unique document identifier and version identifier assigned to the file are stored in or registered with a document control authority. For example, the identifiers are registered within the document control server 108, or any other node 104, 108 or 112 operating as the document control authority.

Thus, in accordance with embodiments of the present invention, a file may be stored in a storage system 112, with a record of the file identifier and the version identifier stored in the document control authority or server 108. Accordingly, it can be appreciated that the modification or creation of documents may be reported to the central document control authority 108 by the clients, such that the document control authority 108 may maintain a record of and control over registered documents. In accordance with other embodiments of the present invention, the file may be stored on a client 104 or the document control server 108. In accordance with further embodiments, a client 104 may also function as a document control authority.

Figure 4:
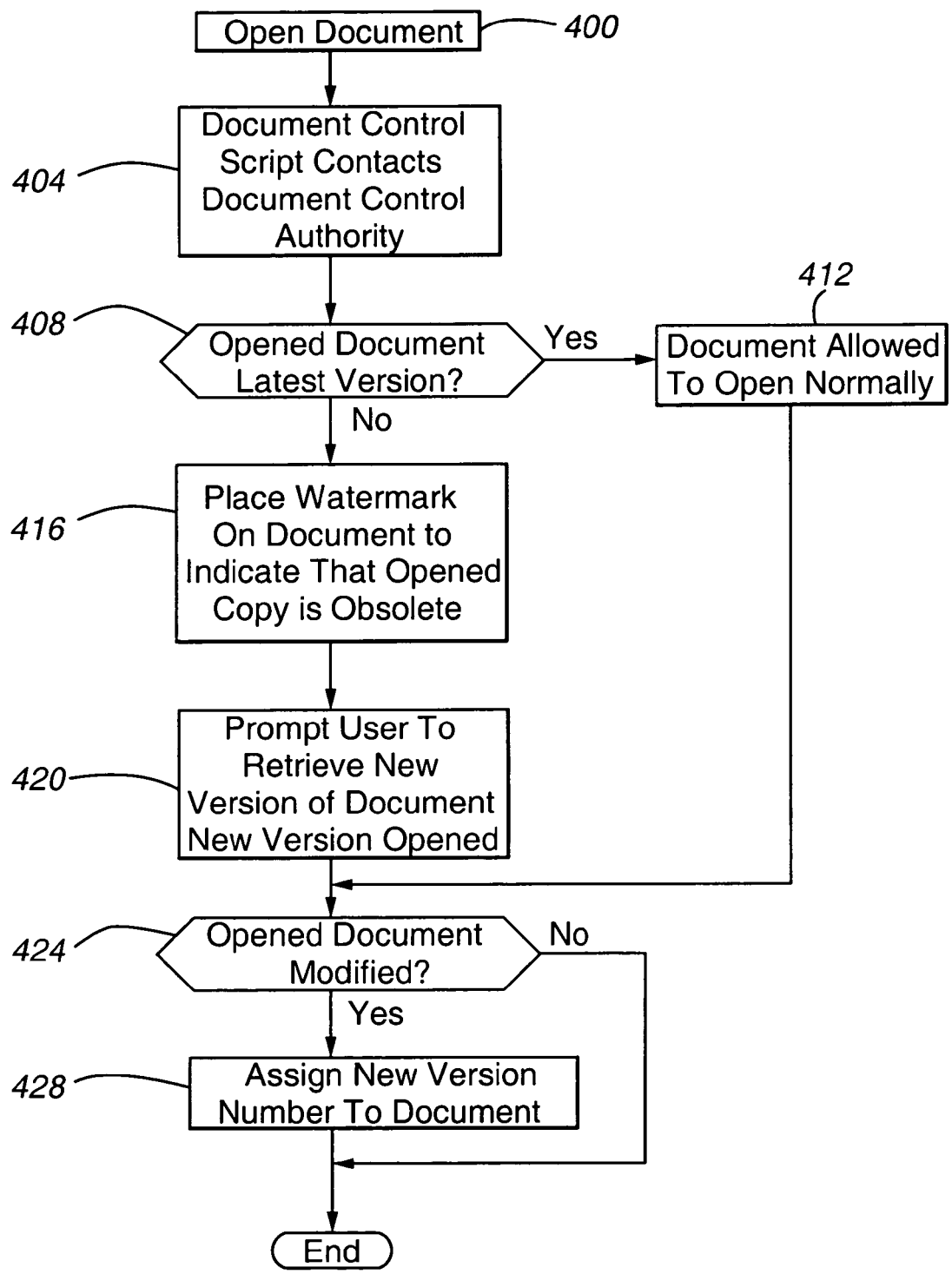
FIG. 4 is a flowchart depicting aspects of the operation of embodiments of the present invention.

With reference now to FIG. 4, additional aspects of the operation of embodiments of the present invention are illustrated. In particular, FIG. 4 illustrates operations that may be taken in connection with accessing a file registered with a document control authority of a document control system 100 in accordance with embodiments of the present invention. As can be appreciated by one of skill in the art and from the description provided herein, the described operations may be performed or controlled by document control applications 216 running on various of the nodes 104, 108 and/or 112, and may further be performed in connection with scripts or objects associated with individual files. Initially, at step 400, a command to open a file registered with the document control authority is entered. For example, the user of a client computer 104 may open a copy of a document stored on the client computer 104 itself. At step 404, the document control script or object associated with or embedded in the document that the user has selected to open contacts the document control server 108. For example, the script or object running on the client computer 104 as a result of opening the document may contact the document control server 108 across the communication network 116.

At step 408, a determination is made as to whether the opened file is the latest available version. For example, the server document control application 216 running on the document control server 108 may compare the version number of the uniquely identified document opened on the client computer 104 to the most recent version number for that document listed or maintained by the document access control application 216. If the opened document is the latest version, for example the version number of the opened document is equal to the latest version number registered with the document control authority, the document is allowed to open normally (step 412). If the version number of the opened document indicates that it is not the latest available version, the file opened on the client computer 104 is altered to indicate that the opened copy is obsolete (step 416). For example, if the version number of the opened file is less than the latest version registered with the document control authority, the copy of the file opened by the user may be altered. In accordance with additional embodiments of the present invention, the document control authority implemented as part of the document access control system 100 may maintain a record of a valid (or current) version number, and any copy of a file not having that version number is altered to so indicate.

In accordance with embodiments of the present invention, the alteration of the file includes or is accompanied by a notification to the user that the copy of the file opened by the user is obsolete. In accordance with embodiments of the present invention, the alteration of the file may include placing a watermark on or in the file. Such a watermark may comprise a visual aspect, that provides notification of the file's obsolescence to the user when that file is viewed, for example when a file comprising a document is opened on a client computer 104. In addition, the watermark may comprise data stored as part of the file data, thereby electronically marking the file as obsolete. As a further example, a watermark may be displayed after the file is opened and after the determination that the version of the file is obsolete has been made.

At step 420, the user may be prompted to retrieve a new or current version of the file, for example from the document storage system 112. As can be appreciated by one of skill in the art, such a prompt may be provided as part of or integral to the notification to the user that the file is obsolete. Alternatively, the current version of the file may be automatically retrieved from another node in the document access control system 100, such as from another client computer 104 or the document control server 108.

After the document has been allowed to open normally (step 412), or after the user has been prompted to retrieve a new version of the document and has retrieved that version, a determination is made as to whether the opened document, here the current document, has been modified (step 424). If the open document has been modified, a new version number is assigned to the file (step 428). The new version number is associated with the copy of the file itself, and is also registered with the document control authority. In accordance with embodiments of the present invention, the new version of the file may be stored in the document storage system 112. Alternatively, the file may be stored on the client computer 104 used to make the modifications, or some other network node 104, 108, 112. A pointer to the current version of the file may be associated with the record maintained by the document control authority, allowing the current version of the file to be located, regardless of wherein the system 100 is stored. After the new version number has been assigned, or if the opened document has not been modified, the operation ends. As can be appreciated by one of skill in the art, the step of assigning a new version number can be performed each time a command to save a file is made. Alternatively, a new version number may only be assigned to a version of a file if the user making the modifications chooses to assign a new version, and/or if the user has proper authorization. In accordance with embodiments of the present invention, the version number is assigned by the document control authority. For example, the document control authority may assign a new version number in response to a request from the client generated after a determination that the document has been modified. Therefore, control over the current version of a file may be maintained by the document control authority. Accordingly, embodiments of the present invention may be used to enforce policies regarding the use of and access to file versions.

Figure 5:
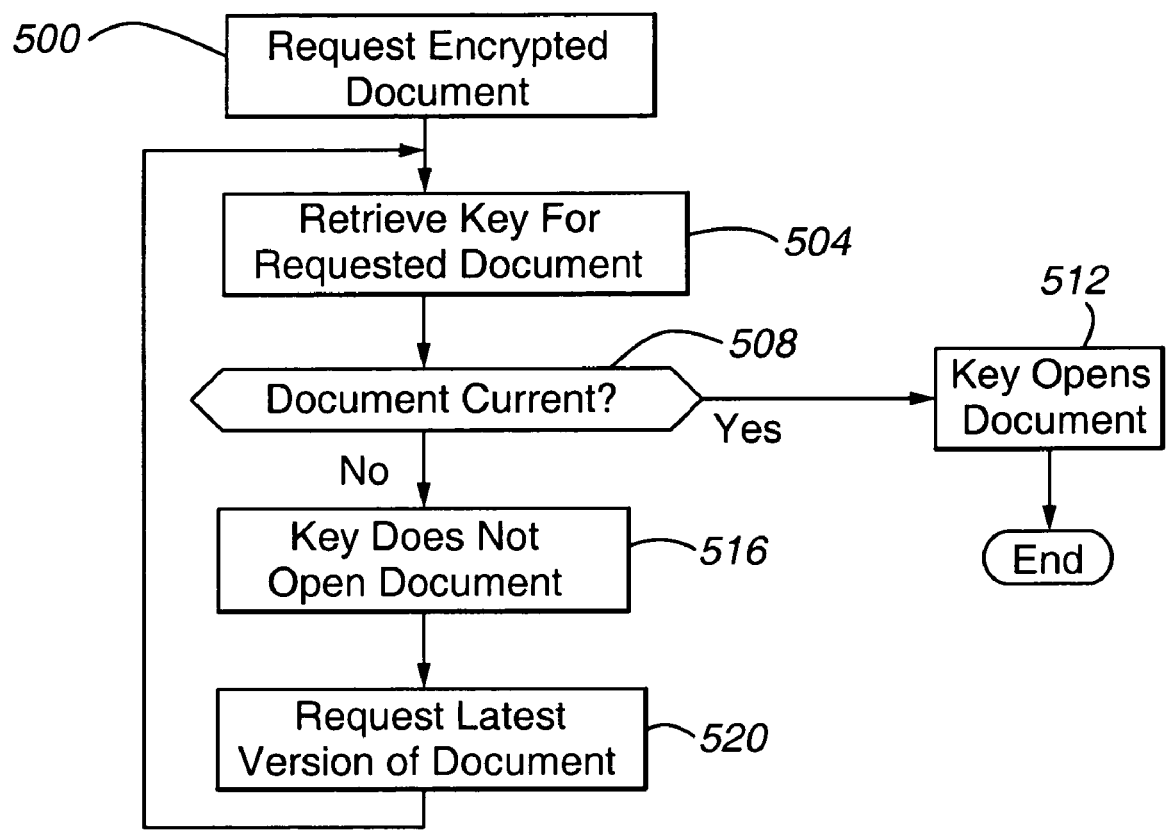
FIG. 5 is a flowchart depicting aspects of the operation of embodiments of the present invention.

With reference now to FIG. 5, aspects of the operation of additional embodiments of the present invention are illustrated. Initially, at step 500, a request for an encrypted document is received or detected by a document control application 216. The request for an encrypted document may comprise a command entered at a client computer 104 to open a selected file. In connection with the request for an encrypted file, a key is requested for the requested file by the document control application 216 running on the client computer, and is received from the document control server 108 (step 504). Alternatively, the request for the required key can be generated by a script or object associated with the encrypted file. At step 508, a determination is made as to whether the requested file is current. If the requested file is current, the retrieved key opens the document (step 512). The user may then proceed to access the document normally. As can be appreciated by one of skill in the art, the determination at step 504 may comprise determining whether the key successfully decrypts the file.

If the requested file is not current, the key does not open that file (step 516). The inability of the key to open the requested file indicates to the user that the file is obsolete. In accordance with further embodiments of the present invention, in response to the failure of a key to open a requested file, a message may be generated indicating to the user that the file is obsolete. Furthermore, the requested file may be altered to provide immediate notification to a requesting user that the requested file is obsolete.

At step 520, the user may request the latest version of the document. For example, the user may request the copy of the file stored in the storage system 112. The process may then return to step 504, and an attempt to open the requested file may be made as described above.

As can be appreciated by one of skill in the art, embodiments of the document access control method and apparatus described herein utilizing encryption can prevent users from accessing the content of obsolete files, while allowing files to be stored locally for fast access. In particular, according to embodiments of the present invention, a user can be assured they are using the current version of a file, even though the file itself is stored locally, by communicating the unique identifier and version identifier for the file to a document control authority. Only if the document control authority indicates that the local version of the file is not obsolete can a complete version of the file be retrieved from a remote storage device. In addition, a system utilizing access keys may provide an indication that a file is not current by destroying or expiring any key that had been created for an obsolete file.

Although various examples provided herein describe accessing files stored on a client 104 and determining whether a more current version of the file is available elsewhere, the present invention is not so limited. For instance, a user of a first client 104a may open a file stored on a second client 104b, a document control server 108, or a document storage system 112, and the system may operate to determine whether the opened document is obsolete and to notify the user if an updated version is available. Accordingly, a system in accordance with embodiments of the present invention may be used to ensure that an accessed document is up to date even if the accessed document is not stored locally.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for enforcing document version policy, comprising:

receiving a request to open a first version of a first document;

in response to said request to open, comparing a version identifier associated with said first version of said first document to a version identifier of a current version of said first document to determine whether said requested first version of said first document is obsolete; and in response to determining that said first version of said first document is obsolete, replacing a first key required to open said first version of said first document with a second key required to open a second version of said first document, wherein said second version is the current version, and wherein a user is provided with said second key and not said first key, whereby said user can open said second version of said first document and not said first version of said first document.

2. The method of claim 1, wherein in response to determining that said first version of said first document is obsolete, said first version of said first document is altered to indicate it is obsolete.

3. The method of claim 2, wherein said first version of said first document is altered by adding a watermark, and wherein the watermark includes a textual message indicating that the first version of said first document is not a current version.

4. The method of claim 1, further comprising:

delivering said requested second version of said first document to said user.

5. The method of claim 1, further comprising:

assigning a first version identifier to said first version of said first document;

modifying said first document to create said second version; and assigning a second version identifier to said second version of said first document.

\* \* \* \* \*